Aug. 16, 1938.   D. D. PEEBLES   2,126,807
METHOD FOR THE MANUFACTURE OF STABLE POWDERED
FOOD PRODUCTS CONTAINING MILK SUGAR
Filed July 2, 1934
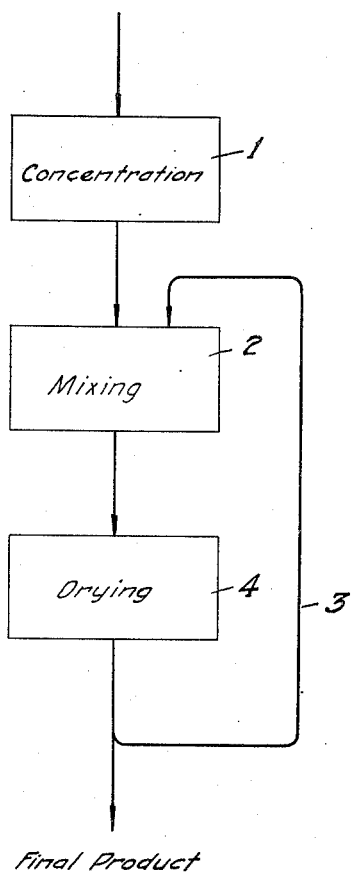
INVENTOR
David D. Peebles
BY
Paul D. Flehr
ATTORNEY Patented Aug. 16, 1938

2,126,807

UNITED STATES PATENT OFFICE 2,126,807

METHOD FOR THE MANUFACTURE OF STABLE POWDERED FOOD PRODUCTS CONTAINING MILK SUGAR

David D. Peebles, Eureka, Calif.

Application July 2, 1934, Serial No. 733,412

3 Claims. (Cl. 99—56)

This invention relates generally to the manufacture of granular products in stable form from milk products such as whey containing such quantities of milk sugar that complete desiccation thereof results in a product markedly hygroscopic.

It has previously been known that materials relatively high in milk sugar or lactose content, such as milk whey, can be desiccated to form a dry powder. However, if the desiccation is substantially complete the marked hygroscopic nature of such desiccated product has rendered it unfit for commercial purposes. If a mass of such desiccated material, as for example desiccated whey, is left exposed to the atmosphere, it rapidly absorbs moisture and in time is converted to a solid cake. Therefore, it is impracticable to store or ship the same except in expensive sealed cartons or containers. Furthermore, such material is not readily soluble, and when mixed with water tends to form sticky lumps. It is therefore relatively unpalatable and is not in proper condition to be used as a stock feed or for human consumption. Briefly, such desiccated material is highly hygroscopic mainly because the milk sugar content thereof, which constitutes a substantial percentage of the solids of milk whey, is in anhydrous form. In a stabilized product, such as is produced by the present method, the milk sugar content is in the form of a monohydrate and is relatively stable when exposed to the atmosphere.

One method of manufacturing stable products of the above character is to first form a desiccated powder, in which the milk sugar is anhydrous, as by spray drying, after which the anhydrous powder is permitted or caused to absorb water to form a hard cake, and the hard cake is then ground. Such a method is relatively costly, due to the apparatus required and the period of time required for treatment. Likewise, certain factors involved may cause the formation of an inferior product. A further method of forming a stable product consists in permitting a concentrate of the whey to set for a sufficiently long period of time to permit the lactose to crystallize and the mass to thereby become pasty, being then disintegrated, spread on trays and dried in tunnels to a brittle condition after which it is ground to form the final stabilized product. This latter method likewise requires expensive equipment and a relatively long period of time for completion, especially by reason of the setting period and the slowness with which the compact material dries. In both of the methods just outlined, the final product appears to be detrimentally affected because of the relatively long period of contact between the solids of the whey and the water thereof which contains dissolved mineral salts.

In Peebles and Manning Patent No. 1,928,135 there is disclosed another method for the manufacture of stabilized powdered lactose-containing material, such as dried whey, which method avoids the step of grinding a solid cake to form the final product but which first desiccates the milk whey or like material to powdered anhydrous form. In many instances the use of a conventional spray type desiccator, such as is employed for manufacturing dried milk, is objectionable because of the cost of installing and maintaining such equipment, together with the auxiliary apparatus required for its operation. Also the treatment disclosed in this patent, to convert the anhydrous powder to a stabilized non-hygroscopic powder, requires considerable equipment.

It is an object of the present invention to provide a novel method for manufacturing stabilized products from materials of the above character, which will avoid a relatively long period of set, or intermediate conversion of the material to anhydrous form.

Another object of the invention is to enable relatively rapid formation of the desired stable or crystalline form of lactose, the method in this connection being characterized by an accelerated rate of crystal formation.

A further object of the invention is to provide a method of the above character which will produce a final powdered product having a high degree of stability—that is, which will not be hygroscopic to any material degree when exposed to the atmosphere.

Further objects of the invention will appear from the following description in which the preferred embodiment of the invention has been set forth in detail in conjunction with the accompanying drawing. It is to be understood that the appended claims are to be accorded a range of equivalents consistent with the state of the prior art.

In carrying out the present invention, the liquid material from which the final product is to be manufactured is first concentrated, and this concentrate is then mixed with a powdered material which has previously been formed in stabilized condition with its lactose content crystallized. The mix is then further treated, without transposition into the form of a hard cake, to form the final stabilized and powdered product.

In practice I proceed as follows:—Assuming that the material being employed is milk whey (formed as a by-product in the manufacture of cheese, or by the removal of casein from skim milk with rennet or by acidulation), the whey is passed through a suitable concentrating apparatus or evaporator. However, before such treatment, it is often desirable to carry out a certain amount of neutralization whereby the hydrogen ion concentration is controlled, in order to prevent inversion of the lactose. Where a mineral acid has been employed to precipitate the casein, neutralization of remaining mineral acid serves to avoid corrosion of the equipment. Likewise, it is generally desirable to pasteurize the whey to neutralization, in order to prevent further formation of lactic acid. Such preliminary treatment is not to be considered as essential, but may be practiced in accordance with the condition of the whey being employed and in accordance with the character of product desired. The temperature or temperatures and the time period of treatment in the evaporator should preferably be such that the material is not seriously discolored or otherwise affected to the detriment of palatibility, odor, nutritive value, or general quality of the concentrate. Good results have been secured by continuing evaporation until the concentrate contains about 50% solids.

The concentrate obtained as described above is then continuously mixed with a powdered product having a substantial milk sugar content, and which has previously been formed in stabilized condition with its lactose content crystallized, whereby it is substantially non-hygroscopic. Preferably, this product is a portion of the product resulting from the present method, which is diverted and returned for intermixing with the concentrate, as will be presently explained. The proportions utilized between the powdered material and the concentrate may vary somewhat but should be such that substantially all the water from the concentrate is absorbed in the mix, whereby the mix takes on the characteristics of a divided solid material, as distinguished from a paste or a liquid.

When the liquid concentrate and the powdered material are mixed together, the liquid concentrate coats the particles of powdered material which absorbs much of the moisture therefrom, without, however, substantially dissolving the particles or cementing them together into a continuous mass. Thus it may be said that the coated particles remain substantially discrete and when subjected to the drying operation hereinafter described, they are readily accessible to the drying air and quickly dried.

The intermixing referred to above is preferably carried out with considerable agitation and kneading, to avoid the formation of lumps or crystals of a size larger than is desired in the final product, and to thoroughly mix and distribute the concentrate throughout the powder. Thus, the concentrate and the powdered stabilized material can be fed simultaneously to a suitable mixer, where thorough intermixing and kneading occurs, and from which the divided homogeneous mix is discharged.

The material obtained from the previously described steps of the method, when the mixing is carried out within suitable limits as to proportions, contains a somewhat greater amount of water than is desired for proper preservation, although it has the physical form of a divided material as distinguished from a paste or a fluid. Therefore, after discharge from the mixing mill, surplus moisture is removed under conditions which will avoid the cementing together of particles to form large lumps or masses. For example, such drying can be carried out by contact with a drying gas, such as air, either while subjecting the material to agitation, or while the material is suspended in the drying gas, or both. After such treatment the material is in final form and may be placed in bags or other suitable containers for storage or distribution.

The drawing graphically outlines the process just described. Step 1 represents treatment of the milk whey, or like material, in an evaporator to effect concentration. Step 2 represents intermixing of the concentrate together with a portion of the final powdered and stabilized product, which is returned by way of line 3. Step 4 represents drying of the divided mix while the material is in suspension with a gaseous drying medium. During or in connection with drying, the material can be passed through blowers and/or impacted against baffles to maintain the desired particle size. In a typical instance, the total water content (including water combined with the lactose) in a final stabilized whey product may be about 5% or 6% by weight. However, in general the total water content can be varied at will within reasonable limits.

The final divided product contains some particles which are granular in character, although a part of the material is a relatively fine powder, probably by virtue of breaking up of larger particles during the drying operation. The non-hygroscopic character of the final product is attributed to the fact that the milk sugar content is substantially entirely in the form of a monohydrate. The amount of water so associated with the milk sugar amounts to about 5% by weight of the total milk sugar content, the remainder of the water being absorbed by the other solid constituents.

It is characteristic of my method that no considerable number of objectionably large lumps is permitted to form, and therefore expensive grinding of the same is obviated. A further attribute is that a long setting period, or period of rest, after concentration, to permit crystallization of the milk sugar, is avoided. This is due to the fact that, when the concentrate is intermixed with previously dried stabilized material and during the subsequent removal of surplus moisture, crystallization of the lactose to the form of a monohydrate proceeds at a rapidly accelerated rate, due to the seeding action of the previously stabilized material which is being mixed with the concentrate. Thus drying to remove surplus moisture can proceed at an accelerated rate, although not faster than the rate of crystallization of lactose. In effect, the drying is on seed crystals of lactose, simultaneously with solidification of the lactose in the form of a monohydrate. In practice I have secured good results by utilizing a drying gas having a temperature of about 290° F. at the time of initial contact with the material though it will be understood that the material is not raised to such temperature as it is cooled by the rapid evaporation taking place from the particles thereof.

Removal of surplus moisture by contacting the divided material with a drying gas is desirable because by such procedure I avoid possible formation of large lumps after mixing, such as would require subsequent grinding—except such lumps as can be readily crushed. The distribution of the liquid concentrate on the particles of powdered material makes possible a rapid rate of drying and the contact of the liquid with the crystals of the previously dried product accelerates the crystallization from the liquid.

The degree of concentration obtained in the evaporator may vary somewhat in accordance with the equipment employed or the character of the material being treated but it is essential for the subsequent treatment that a fair degree of fluidity of the concentrate be preserved. In some instances, concentration may be carried to such a degree as to secure the formation of some milk sugar crystals before the discharge from the evaporator, in which event the evaporator should be of such a character as to avoid clogging. Generally, a high degree of concentration, commensurate with the type of evaporating equipment being used and the material being treated, is desirable, because it is more economical to remove moisture at this stage of the method than during subsequent steps.

I claim:

1. In a method of producing a non-hygroscopic powdered food product from liquid lactose-containing material, the steps of evaporating the liquid material to produce a liquid concentrate, and then rapidly increasing the ratio between solids and liquid content until a non-hygroscopic divided solid product is obtained in which the water content is ample to supply water of crystallization for the milk sugar, the rapid increase in ratio between solids and liquid content being obtained by mixing the liquid concentrate with a powdered non-hydroscopic lactose-containing material.

2. In a method of manufacturing a stabilized powdered lactose containing product from liquid lactose containing material tending to be markedly hygroscopic when in anhydrous powdered form, concentrating said liquid material to a liquid concentrate, mixing with said concentrate a powdered stabilized lactose containing material to form a divided solid mixture, said mixture containing sufficient water to supply water of crystallization for the lactose content, and removing surplus water from the mixture without converting the lactose contained therein to anhydrous form.

3. In a method of manufacturing a powdered and stabilized lactose containing product from lactose containing liquid material tending to be markedly hygroscopic when in anhydrous powdered form, concentrating said liquid material to form a liquid concentrate, mixing the concentrate with stabilized and powdered lactose containing material, kneading the material simultaneously with said mixing whereby formation of relatively large crystals or large compact cakes is avoided, the divided mixture containing more than sufficient water to supply water of crystallization for the lactose content, removing surplus water from the mixed or kneaded mass without conversion of lactose to the anhydrous form, whereby a final powdered and stabilized lactose containing material is produced, and utilizing a portion of said final product for mixing with a succeeding quantity of concentrate.

DAVID D. PEEBLES.